US009208604B2

(12) United States Patent
Watanabe et al.

(10) Patent No.: US 9,208,604 B2
(45) Date of Patent: Dec. 8, 2015

(54) RENDERING PROCESSING METHOD AND APPARATUS

(71) Applicants: FUJITSU LIMITED, Kawasaki-shi, Kanagawa (JP); The University of Tokyo, Tokyo (JP)

(72) Inventors: Masahiro Watanabe, Kawasaki (JP); Satoshi Fuchikami, Fukuoka (JP); Yoshimasa Kadooka, Kawasaki (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 245 days.

(21) Appl. No.: 13/940,736

(22) Filed: Jul. 12, 2013

(65) Prior Publication Data

US 2014/0022252 A1    Jan. 23, 2014

(30) Foreign Application Priority Data

Jul. 17, 2012    (JP) ................. 2012-158747

(51) Int. Cl.
*G06T 15/50* (2011.01)
*G06T 15/00* (2011.01)
*G06T 15/04* (2011.01)

(52) U.S. Cl.
CPC .............. *G06T 15/50* (2013.01); *G06T 15/005* (2013.01); *G06T 15/04* (2013.01)

(58) Field of Classification Search
None
See application file for complete search history.

(56) References Cited

U.S. PATENT DOCUMENTS

| 7,529,396 B2 * | 5/2009 | Matsumoto | 382/128 |
| 2010/0036248 A1 * | 2/2010 | Chouno | 600/443 |

OTHER PUBLICATIONS

Tremeau, Alain et al. "A Region Growing and Merging Algorithm to Color Segmentation." *Pattern recognition* 30.7 (1997) pp. 1191-1203.
Kass, Michael et al. "Snakes: Active contour models." *International Journal of Computer Vision* (1988) pp. 321-331.
Sethian, J. A. *Level Set Methods and Fast Marching Methods: Evolving Interfaces in Computational Geometry, Fluid Mechanics, Computer Vision, and Materials Science.* vol. 3. Cambridge university press, (1999). pp. xvii-xx, 2-13, 360-375.
Nagy, Zoltán et al. "Depth-Peeling for Ttexture-Based Volume Rendering." *Computer Graphics and Applications, 2003. Proceedings. 11th Pacific Conference on.* IEEE, (2003) pp. 429-433.
Engel, Klaus et al. "High-Quality Pre-Integrated Volume Rendering Using Hardware-Accelerated Pixel Shading." *Proceedings of the ACM SIGGRAPH/EUROGRAPHICS workshop on Graphics hardware.* ACM, (2001) pp. 9-16.

(Continued)

*Primary Examiner* — Said Broome
(74) *Attorney, Agent, or Firm* — Staas & Halsey LLP

(57) ABSTRACT

A disclosed method includes extracting a region from each of plural cross sections in a volume data representing a solid to be rendered, based on data of brightness values of texels for each of the plurality of cross sections, wherein the plural cross sections are perpendicular to an axis set for the volume data; deleting any one of two adjacent cross sections among the plural cross sections based on a correlation between a region extracted for one cross section of the two adjacent cross sections and a region extracted for the other cross section of the two adjacent cross sections; and rendering the solid by using data of the cross sections after the deleting.

7 Claims, 15 Drawing Sheets

(56) References Cited

OTHER PUBLICATIONS

Ikits Milan et al., "GPU Gems: Part VI—Beyond Triangles, Chapter 39. Volume Rendering Techniques", NVIDIA Corporation (2004) pp. 1-21.

Yamazaki, Shuntaro et al. "High-Quality Interactive Volume Rendering on Standard PC Graphics Hardware." *Joho Shori Gakkai Kenkyu Hokoku* 2001.105 (2001) pp. 71-78.

Extended European Search Report mailed Sep. 23, 2013 in corresponding European Application No. 13174785.9.

C. Rezk-Salama et al., "Interactive Volume Rendering on Standard PC Graphics Hardware Using Multi-Textures and Multi-Stage Rasterization", Proceedings 2000 Siggraph/Eurographics Workshop on Graphics Hardware, Aug. 21, 2000. pp. 109-118.

Jürgen P. Schulze et al., "The Perspective Shear-Warp Algorithm in a Virtual Environment", Visualization, 2001, VIS '01, Proceedings, IEEE, PI, Oct. 21, 2001, pp. 207-213.

Michal Beneš et al., "Geometrical Image Segmentation by the Allen-Cahn Equation", Applied Numerical Mathematics, vol. 51, No. 2-3, Nov. 1, 2004, pp. 187-205.

* cited by examiner

AXIS DIRECTION

RENDERING PROCESSING METHOD AND APPARATUS

CROSS-REFERENCE TO RELATED APPLICATIONS

This application is based upon and claims the benefit of priority of the prior Japanese Patent Application No. 2012-158747, filed on Jul. 17, 2012, the entire contents of which are incorporated herein by reference.

FIELD

This invention relates to a rendering processing method and apparatus.

BACKGROUND

For example, photographed images of each inner organ are outputted as gray scale brightness value information from a medical image apparatus such as a Computed Tomography (CT) apparatus, Magnetic Resonance Imaging (MRI) apparatus, or ultrasonic echo apparatus. As a method for rendering volume data that is three-dimensional data, which is obtained by accumulating such images in a perpendicular direction of the images at regular intervals or obtained by simulation using a structured mesh, a volume rendering is known.

Moreover, as a method similar to the volume rendering, a texture-based volume rendering is also known. In this texture-based volume rendering, plural cross sections for the volume data are set to display the volume data as a pattern by interpolating adjacent values. In this method, because the display accuracy depends on the number of cross-sections, it is possible to reduce the processing loads if the number of cross-sections is lesser. However, in case where the number of cross-sections is lesser, when the volume data is rotated in an arbitrary direction in order to change the sight line, the display accuracy may be worsened because the step caused by the large difference between the contents of the cross sections is emphasized in the image.

SUMMARY

This rendering processing method includes: extracting a region from each of plural cross sections in a volume data representing a solid to be rendered, based on data of brightness values of texels for each of the plurality of cross sections, wherein the plural cross sections are perpendicular to an axis set for the volume data; deleting any one of two adjacent cross sections among the plural cross sections based on a correlation between a region extracted for one cross section of the two adjacent cross sections and a region extracted for the other cross section of the two adjacent cross sections; and rendering the solid by using data of the cross sections after the deleting.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
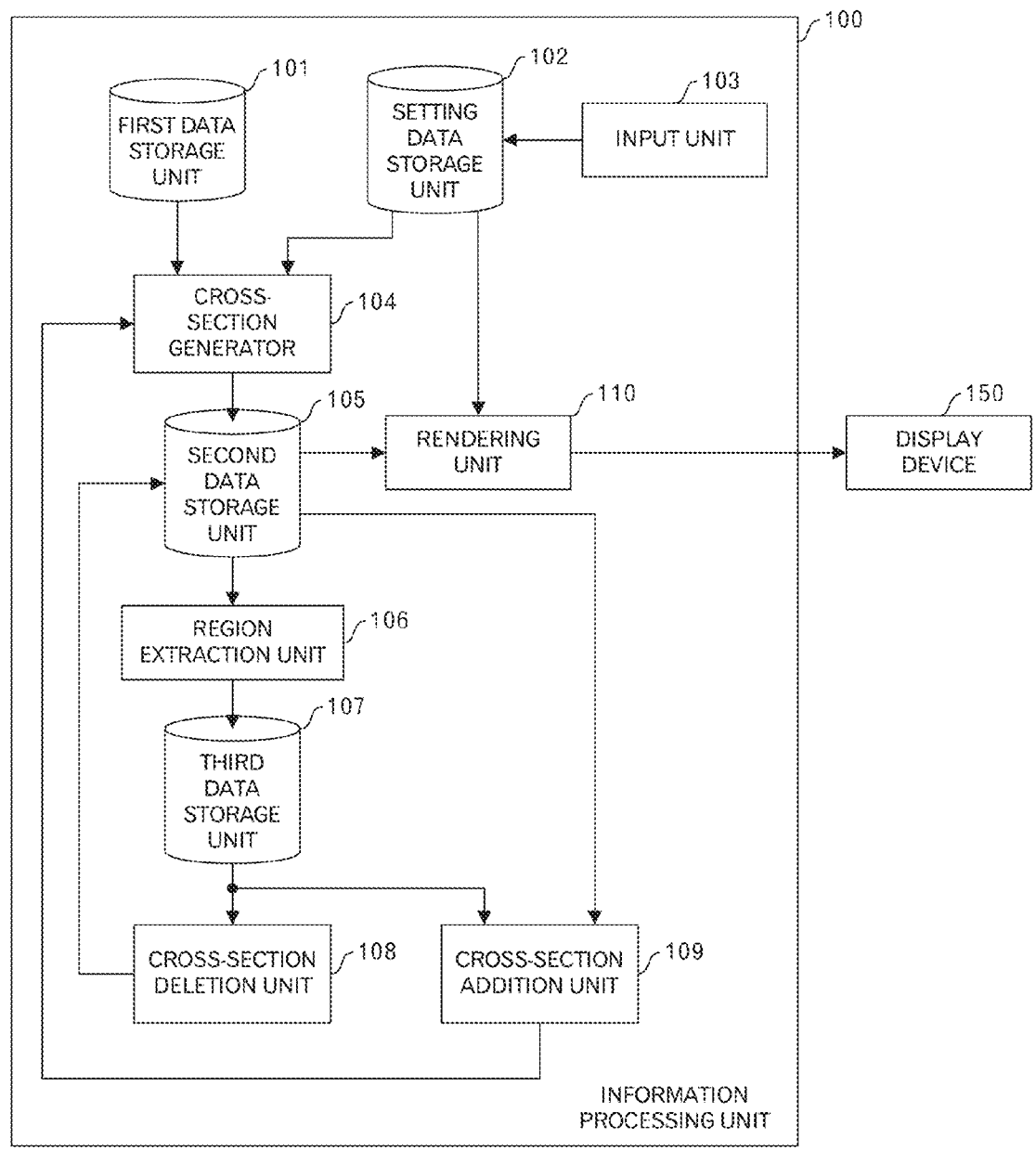
FIG. 1 is a functional block diagram of an information processing apparatus relating to an embodiment.

FIG. 1 illustrates a configuration example of an information processing apparatus 100 relating to an embodiment of this invention. The information processing apparatus 100 relating to this embodiment has a first data storage unit 101, a setting data storage unit 102, an input unit 103, a cross-section generator 104, a second data storage unit 105, a region extraction unit 106, a third data storage unit 107, a cross-section deletion unit 108, a cross-section addition unit 109, and a rendering unit 110, and the information processing apparatus 100 is connected to a display device 150.

The first data storage unit 101 stores a volume data representing a solid to be rendered. The volume data is a set of scalar values or vectors defined for the respective unit cells in the three-dimensional space. Moreover, the volume data may include volume data for plural times. As described above, the volume data is data accumulated at regular intervals in the perpendicular direction of the images including brightness values for the respective pixels. The setting data storage unit 102 stores data of an axis corresponding to the sight line, which is inputted through the input unit 103, and setting data such as the number of cross sections.

The cross-section generator 104 calculates brightness value at each lattice point or gird point on each cross section from the volume data stored in the first data storage unit 101 according to the data stored in the setting data storage unit 102, and stores the calculation results into the second data storage unit 105.

The region extraction unit 106 performs a region extraction processing for each cross section, and stores the results of the region extraction processing into the third data storage unit 107. Although this region extraction processing will be explained in detail later, other conventional methods, which are well-known, may be used.

The cross-section deletion unit 108 performs a deletion processing of a cross section by using data stored in the third data storage unit 107. Moreover, the cross-section addition unit 109 determines, by using the data stored in the second data storage unit 105 and the third data storage unit 107, whether or not the addition of the cross section can be made, and causes the cross-section generator 104 to add the cross section when the addition of the cross section is performed.

The rendering unit 110 performs the texture-based volume rendering by using the data of the cross sections, which is stored in the second data storage unit 105, as textures, and outputs the result of the rendering onto the display device 150.

Next, processing contents of the information processing apparatus 100 relating to this embodiment will be explained by using FIGS. 2 to 17.

Figure 2:
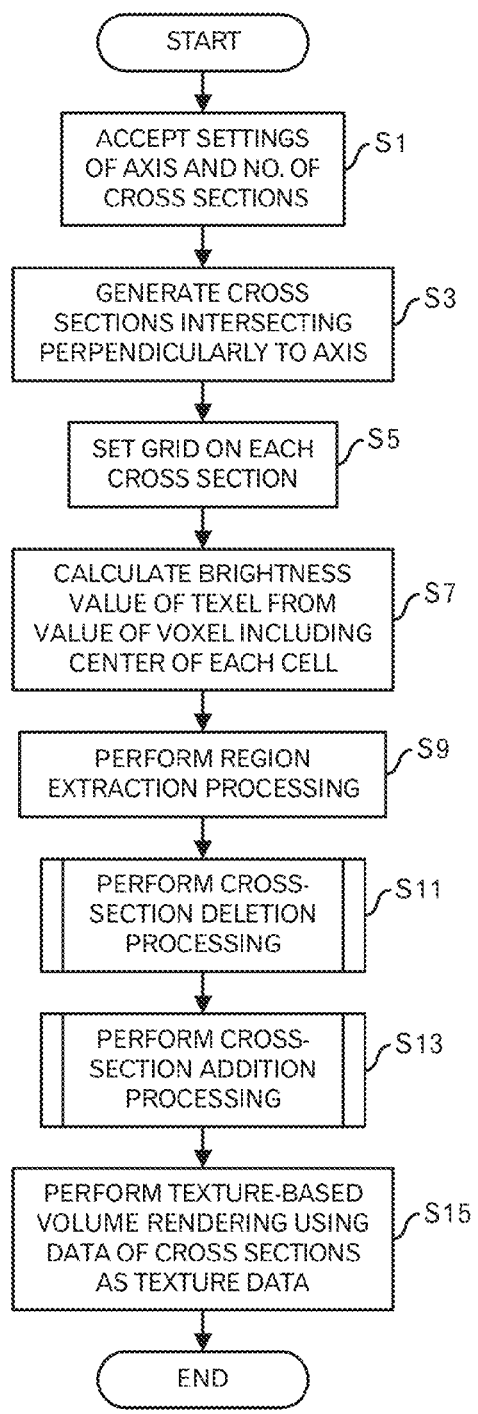
FIG. 2 is a diagram depicting a main processing flow relating to the embodiment.
Figure 3:
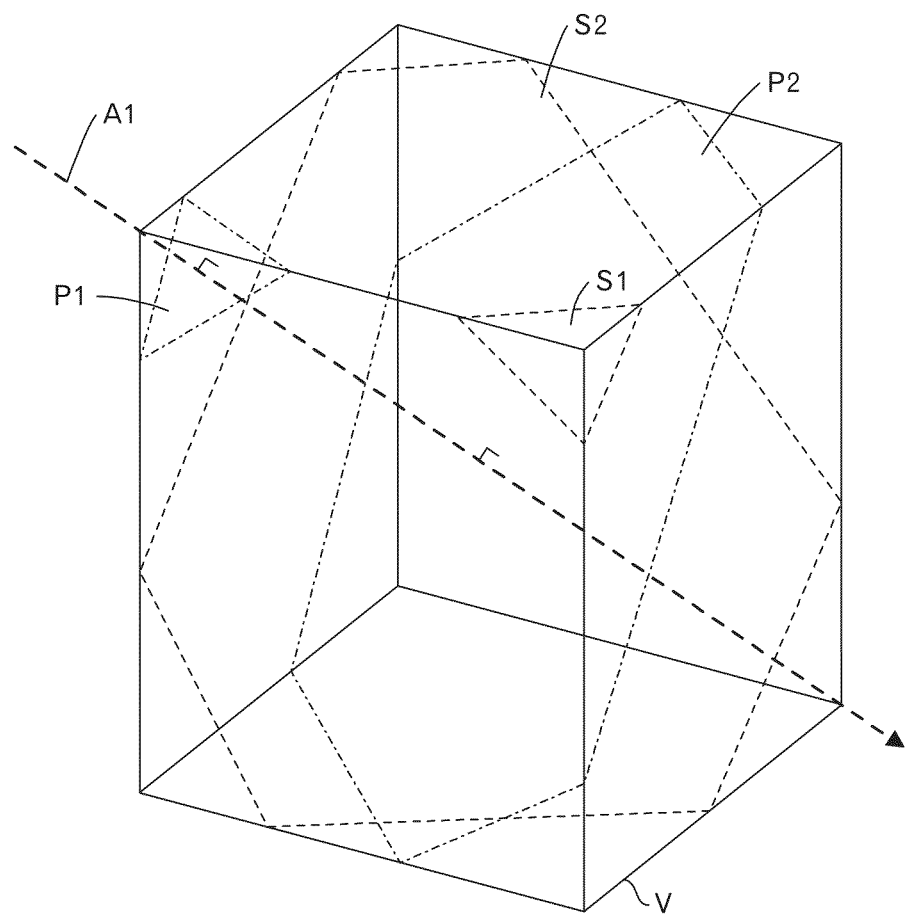
FIG. 3 is a schematic diagram representing a relationship among volume data, an axis and cross sections.

Firstly, the input unit 103 accepts setting inputs of an axis of the straight line and the number of cross sections N from a user or the like, and stores the accepted data into the setting data storage unit 102 (FIG. 2: step S1). FIG. 3 schematically illustrates a relationship among volume data, the axis and cross sections. As illustrated in FIG. 3, volume data V is represented as a hexahedron, and plural voxels are disposed inside of the hexahedron. Moreover, for example, when an axis A1 is set, the cross sections P1 and P2 (dash dotted line), which cross orthogonally to the axis A1, are generated in the following processing. When plural axes can be set and a different axis is set, the cross sections S1 and S2 (dotted line) may be generated, for example. Moreover, instead of the number of cross sections, the interval between the cross sections may be designated. Furthermore, it is presumed that data such as transparency or color map is stored in the setting data storage unit 102.

Next, the cross-section generator 104 generates plural cross sections that cross orthogonally to the axis, for the volume data stored in the first data storage unit 101, according to data concerning the axis and the number of cross sections N, which are stored in the setting data storage unit 102 (step S3). For example, the cross sections are generated at intervals obtained by dividing a length between two points, at which the surfaces of the hexahedron corresponding to the volume data cross with the axis, by (N−1).

Figure 4:
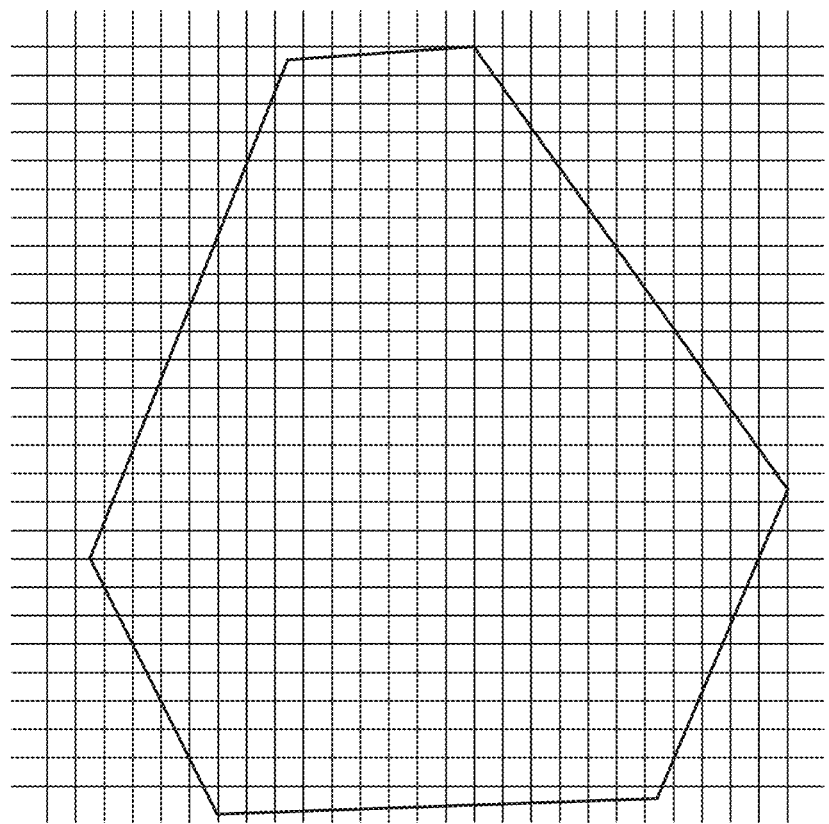
FIG. 4 is a diagram depicting an example that a grid is set to the cross section.

Then, the cross-section generator 104 sets regular grid on each cross section (step S5), calculates a brightness value of each texel on each cross section by using a voxel value (i.e. brightness value) of a voxel including the center of each cell, and stores the calculated brightness values into the second data storage unit 105 (step S7). For example, as illustrated in FIG. 4, a grid having a predetermined pitch is set for the cross section S2 in FIG. 3, and the brightness value of the texel is calculated by using the voxel value of a voxel including the center of the cell (which corresponds to the texel). The voxel value may be set as the brightness value of the texel as it is. The processing up to this step is almost similar to the processing carried out in the typical texture-based volume rendering.

After that, the region extraction unit 106 performs a region extraction processing for data of each cross section, which is stored in the second data storage unit 105, and stores the processing results into the third data storage unit 107 (step S9). The region extraction processing will be explained in detail later, however, the region extraction processing is performed by using a reactor diffusion equation. For example, value separation that will be explained later is carried out. Schematically, as illustrated, for example, in FIG. 5, regions are extracted for each cross section.

Figure 5:
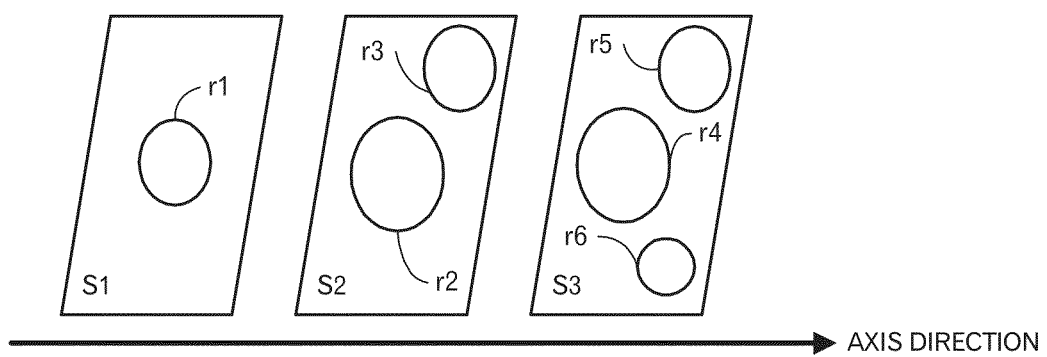
FIG. 5 is a schematic diagram depicting an example of a region extraction result.

In an example of FIG. 5, when the cross sections S1, S2 and S3 exist in direction of the axis, it is presumed that a region r1 is extracted on the cross section S1, regions r2 and r3 are extracted on the cross section S2, and regions r4 to r6 are extracted on the cross section S3.

Next, the cross-section deletion unit 108 performs a cross-section deletion processing (step S11). This cross-section deletion processing will be explained by using FIGS. 6 to 9.

Figure 7:
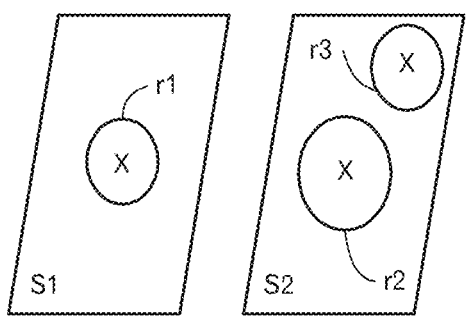
FIG. 7 is a schematic diagram depicting a center of gravity for each region in each cross section.
Figure 6:
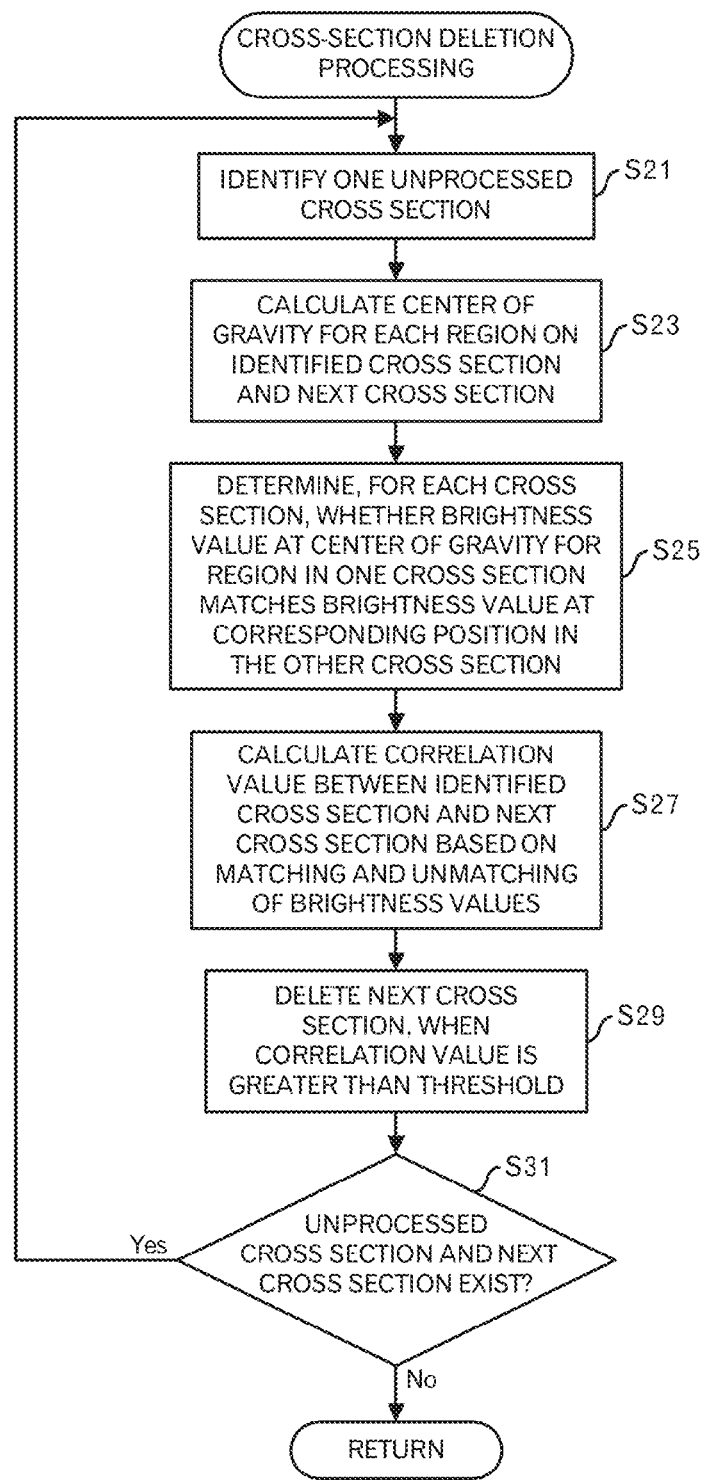
FIG. 6 is a diagram depicting a processing flow of a cross-section deletion processing.

The cross-section deletion unit 108 identifies one unprocessed cross section in order of the axis direction, for example (FIG. 6: step S21). Moreover, the cross-section deletion unit 108 calculates the center of gravity for each region on the identified cross section and next cross section (i.e. adjacent cross section in the axis direction) (step S23). Because the center of gravity for the region can be calculated by a well-known method, the detailed explanation is omitted. For example, in the example of FIG. 5, it is presumed that a point with the X mark is obtained for each region as the center of gravity as illustrated in FIG. 7.

Then, the cross-section deletion unit 108 determines, for each of two cross sections, whether or not the brightness value at the center of gravity for the region of the identified cross section matches the brightness value at a corresponding position (texel) for the other cross section (step S25).

Figure 8:
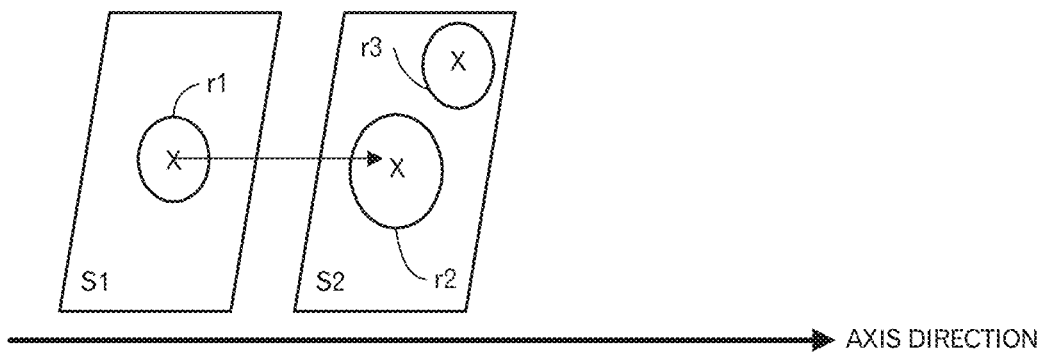
FIG. 8 is a diagram depicting an example of determining matching or unmatching of the brightness value.
Figure 9:
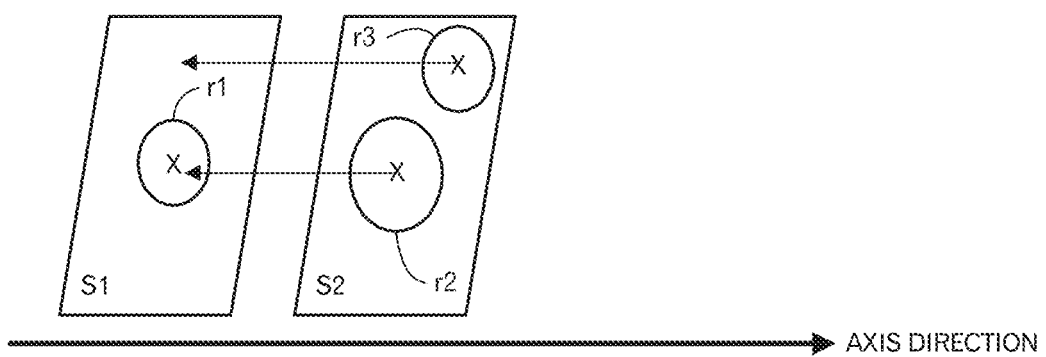
FIG. 9 is a diagram depicting an example of determining matching or unmatching of the brightness value.

For example, in case of processing the cross sections S1 and S2, when seen from the cross section S1 as illustrated in FIG. 8, and traced in parallel with the axis from the center of gravity for the region r1 in the direction of the arrow, the corresponding position in the cross section S2 is a point within the region r2. For example, when the brightness values of the regions r1 and r2 match, the number of matching times "1" is obtained for the direction from the cross section S1 to S2. On the other hand, when seen from the cross section S2 as illustrated in FIG. 9, and traced in parallel with the axis from the center of gravity for the region r3 in the direction of the arrow, the corresponding position in the cross section S1 is included in a portion other than the region r1. Here, it is presumed that the brightness value at the center of gravity for the region r3 does not match the brightness value at the corresponding position. Moreover, when traced in parallel with the axis from the center of gravity for the region r2 in the direction of the arrow, the corresponding position in the cross section S1 is a point within the region r1. As described above, it is presumed that the brightness value at the center of gravity for the region r2 matches the brightness value at the point within the region r1. Then, the number of matching times "1" and the number of unmatching times "1" are obtained.

Then, the cross-section deletion unit 108 calculates a correlation value between the identified cross section and a next cross section based on the matching or unmatching of the brightness value (step S27). In this embodiment, the correlation value r is calculated by $r=(K-M)/n$. K is a total value of the numbers of matching times, and M is a total value of the numbers of unmatching times, and $n=K+M$. In the aforementioned example, $K=2$, $M=1$, and $n=3$, so $r=0.33$ is obtained.

Then, the cross-section deletion unit 108 deletes the next cross section in the first data storage unit 101 in case where the correlation value is greater than a threshold (e.g. 0.8) (step S29). Thus, it is determined whether or not the correlation is high, in other words, the next cross section is a similar cross section, and when it is a similar cross section, the next cross section is deleted. In addition, in order to carry out the cross-section addition processing, it is recorded that the cross section was deleted. For example, when an identifier of the cross section is assigned in sequence in ascending order of the integer, and the identifier is not reassigned even when the cross section is deleted, it is possible to recognize that any cross section is deleted. Otherwise, by preparing a management table for cross sections, a flag may be set for each of deleted cross sections. Moreover, in the aforementioned example, the next cross section is not deleted, because of $r=0.33$.

Then, the cross-section deletion unit 108 determines whether or not an unprocessed cross section and next cross section to the unprocessed cross section exist in order of the axis direction, for example (step S31). When the unprocessed cross section and next cross section exist, the processing returns to the step S21. On the other hand, when no unprocessed cross section or no next cross section exists, the processing returns to a calling-source processing.

Thus, the cross section having the correlation with another cross section is deleted in order to decrease the processing loads. When the cross section has the correlation with another cross section, the deletion does not influence the rendering quality so much.

Returning to the explanation of the processing in FIG. 2, the cross-section addition unit 109 next performs a cross-section addition processing (step S13). The cross-section addition processing will be explained by using FIGS. 10 to 16.

Figure 10:
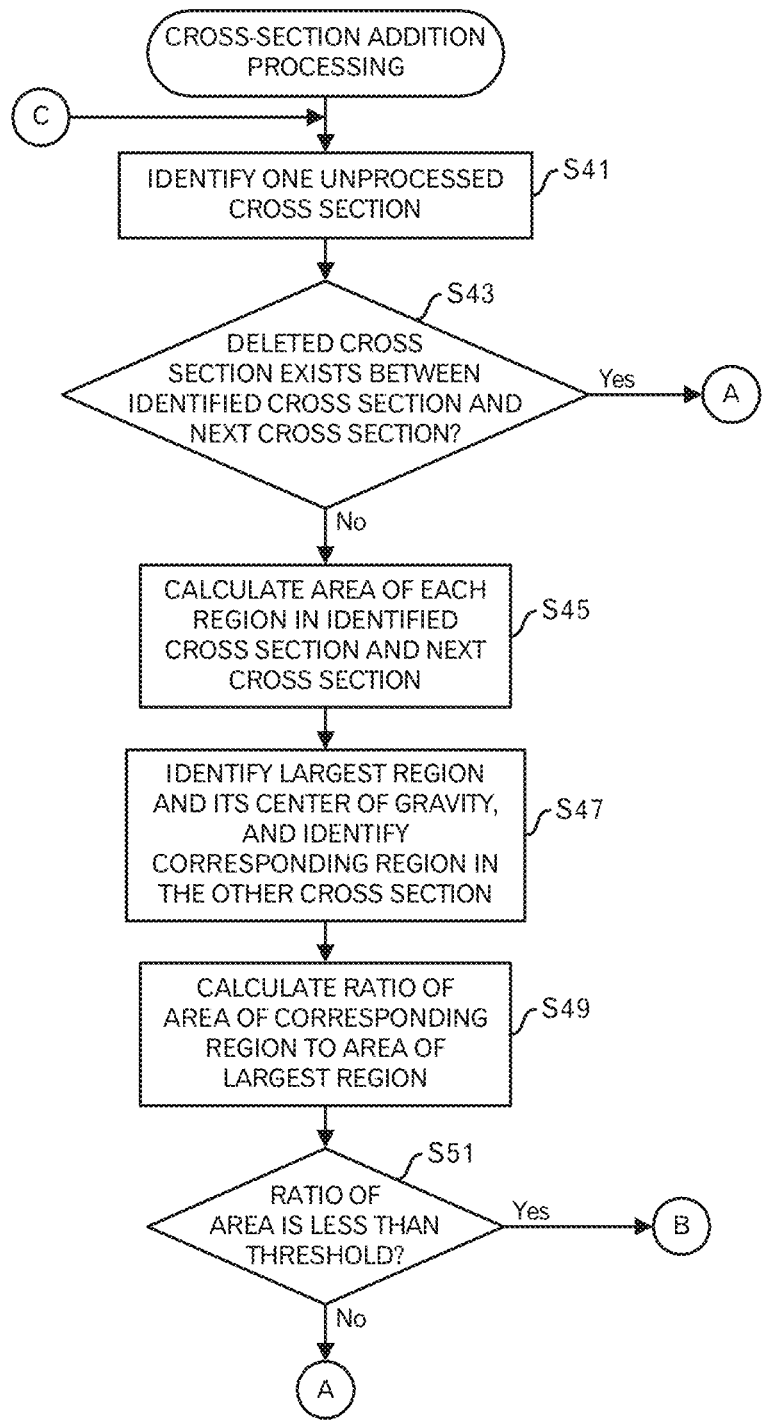
FIG. 10 is a diagram depicting a processing flow of a cross-section addition processing.

First, the cross-section addition unit 109 identifies one unprocessed cross section in the third data storage unit 107 in order of the axis direction, for example (FIG. 10: step S41). Then, the cross-section addition unit 109 determines whether or not any deleted cross section exists between the identified cross section and the next cross section to the identified cross section (step S43). When the deleted cross section exists between the identified cross section and the next cross section, the cross section is not added, and the processing shifts to step S59 in FIG. 13 through terminal A.

Figure 11:
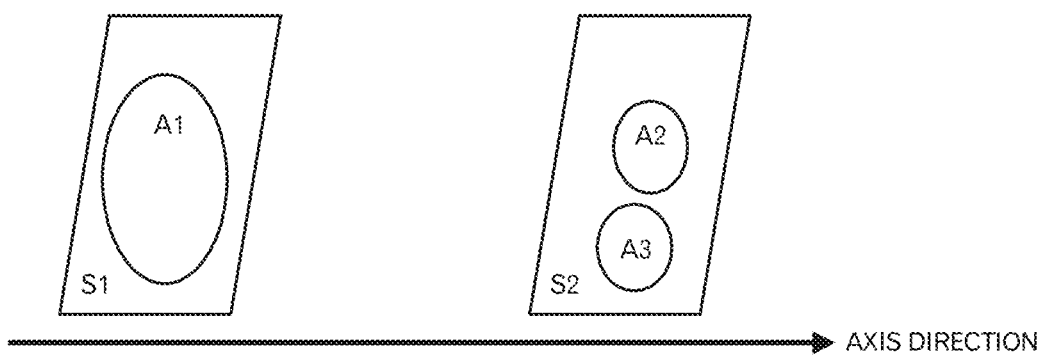
FIG. 11 is a diagram depicting an example of a cross section in which regions are extracted.

On the other hand, when there is no deleted cross section between the identified cross section and the next cross section, the cross-section addition unit 109 calculates an area of each region extracted in the identified cross section and the next cross section (step S45). For example, as illustrated in FIG. 11, it is presumed that region A1 exists in cross section S1, regions A2 and A3 exist in cross section S2. In such a case, the area of each of the regions A1 to A3 is calculated. It is presumed that the relationship "the area of the region A1 >the area of the region A2 >the area of the region A3" is established.

Figure 12:
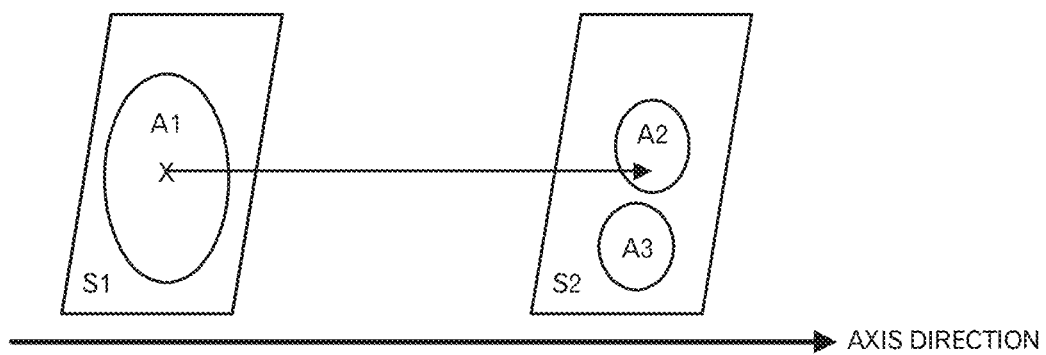
FIG. 12 is a diagram to explain a processing to search for correspondence among the regions.

Then, the cross-section addition unit 109 identifies the largest region and its center of gravity, and identifies a corresponding region in the other cross section (step S47). In the example of FIG. 11, the region A1 is the largest, therefore, as illustrated in FIG. 12, a straight line is extended from the center of gravity for the region A1 in the cross section S1 to the cross section S2 in parallel with the axis, and it is determined what region includes a corresponding point in the cross section S2. In case of FIG. 12, the region A2 is identified as the corresponding region.

After that, the cross-section addition unit 109 calculates a ratio of the area of the corresponding region to the area of the largest region (step S49). Then, the cross-section addition unit 109 determines whether or not the ratio of the area is less than a threshold (e.g. 0.5) (step S51). When the ratio of the area is less, it can be grasped that the size of the region is largely changed.

Figure 13:
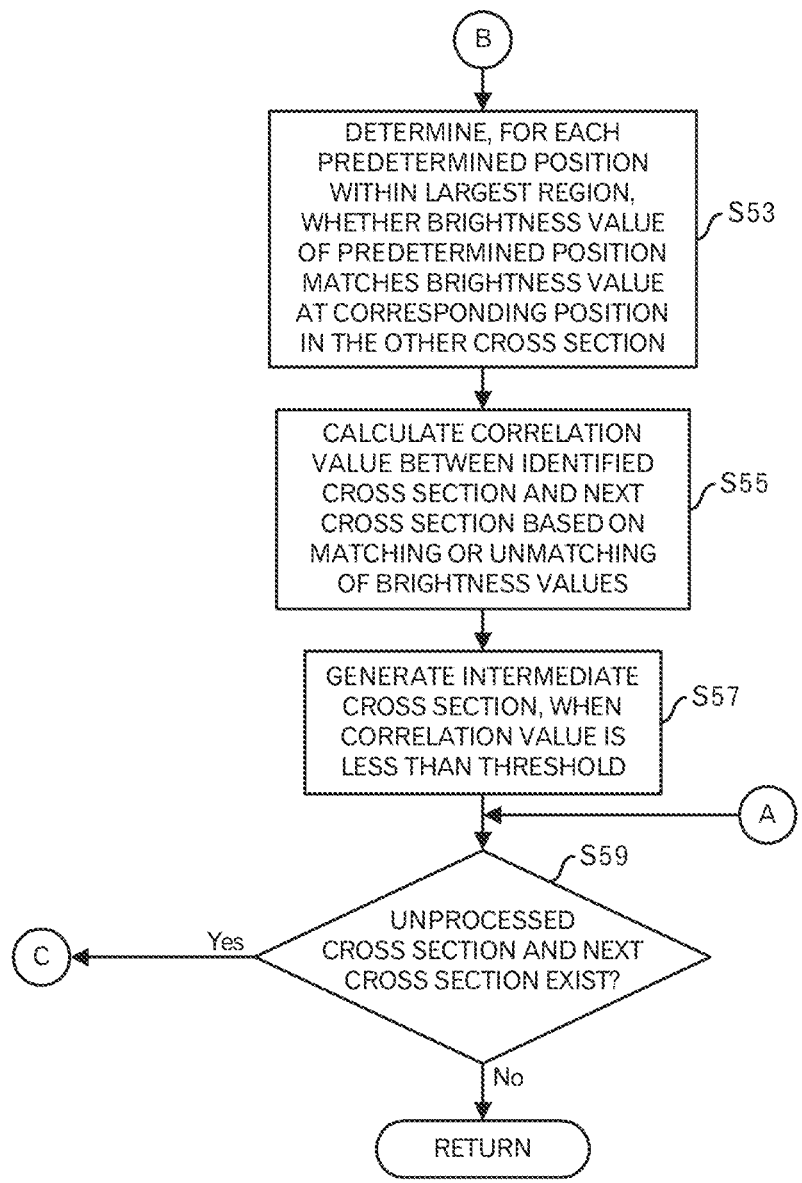
FIG. 13 is a diagram depicting a processing flow of the cross-section addition processing.

When the ratio of the area is less than the threshold, the processing shifts to step S53 of FIG. 13 through terminal B. On the other hand, the ratio of the area is equal to or greater than the threshold, the addition of the cross section is not performed, and the processing shifts to step S59 of FIG. 13 through the terminal A.

Figure 14:
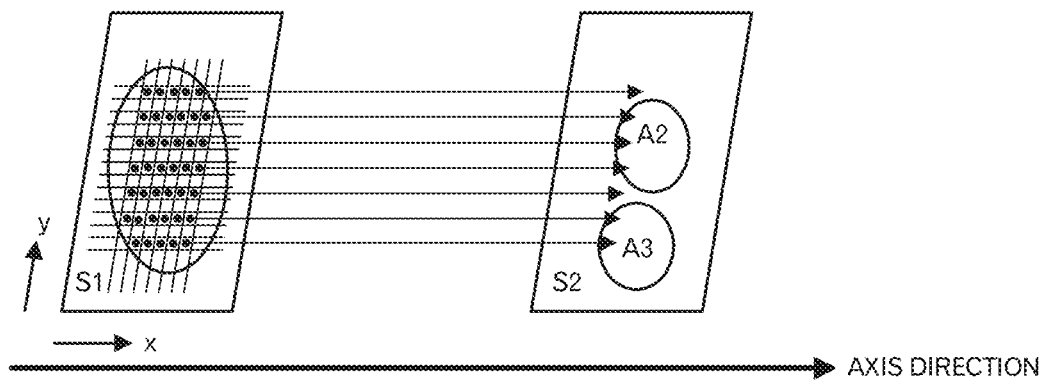
FIG. 14 is a diagram to explain a processing executed when determining matching or unmatching of the brightness value.

Shifting to the explanation of the processing after the terminal B, the cross-section addition unit 109 determines, for each of predetermined positions within the longest region, whether or not the brightness value of the corresponding position in the other cross section matches the brightness value at the predetermined position (step S53). For example, as schematically illustrated in FIG. 14, it is determined whether or not the brightness value of each texel in X-axis direction of the cross section S1 is identical to the brightness value of the corresponding texel in the cross section S2, and it is determined whether or not the brightness value of each texel in Y-axis direction of the cross section S1 on every alternate lines is identical to the brightness value of the corresponding texel of the cross section S2. The X-axis may be exchanged with the Y-axis, and the brightness values of all texels may be compared. Here, the number of matching times K and the number of unmatching times M are also counted.

Then, the cross-section addition unit 109 calculates a correlation value r between the identified cross section and the next cross section based on the number of matching times K and the number of unmatching times M for the brightness value (step S55). The correlation value r is calculated by $r=(K-M)/n$. $n=K+M$.

Figure 15:
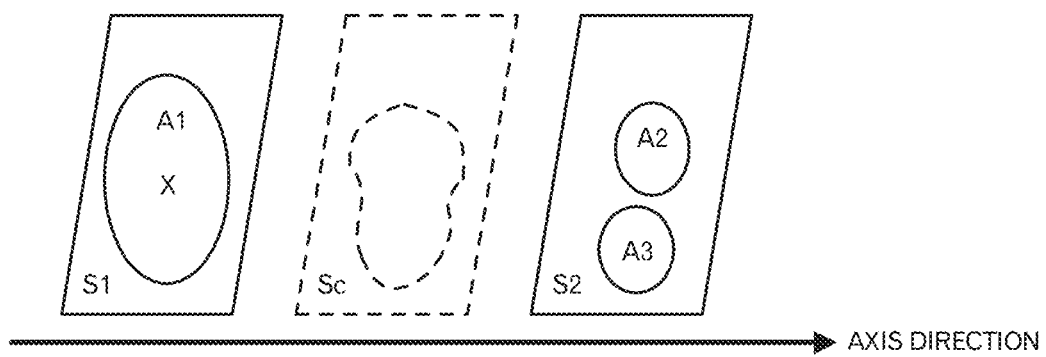
FIG. 15 is a diagram schematically depicting addition of the cross section.

After that, when the correlation value is less than the threshold, the cross-section addition unit 109 instructs the cross-section generator 104 to add a cross section between the identified cross section and the next cross section (step S57). When there is no correlation between two cross sections, it is presumed that any state change occurs between two cross sections. So, at the rendering, any step may be seen. Therefore, as schematically illustrated in FIG. 15, a cross section Sc is added to also render the state transition. The cross-section generator 104 generates data of the cross section at the intermediate position by using parameters used when the cross section is initially generated, and stores the generated data into the second data storage unit 105. More specifically, the processing corresponding to the steps S3 to S7 is carried out for one cross section at the interim position.

Then, the cross-section addition unit 109 determines whether or not any unprocessed cross section and next cross section to the unprocessed cross section exist (step S59). When the unprocessed cross section and the next cross section exist, the processing returns to the step S41 in FIG. 10 through terminal C. On the other hand, when no unprocessed cross section or no next cross section exists, the processing returns to the calling-source processing.

Returning to the explanation of the processing in FIG. 2, the rendering unit 110 uses the cross sections, which are stored in the second data storage unit 105, as the textures to perform the texture-based volume rendering according to the setting data (e.g. color map and transparency) stored in the setting data storage unit 102, and outputs the rendering results to the display device 150 (step S15).

Figure 16:
FIG. 16 is a diagram representing an example of an image generated by this embodiment.
Figure 17:
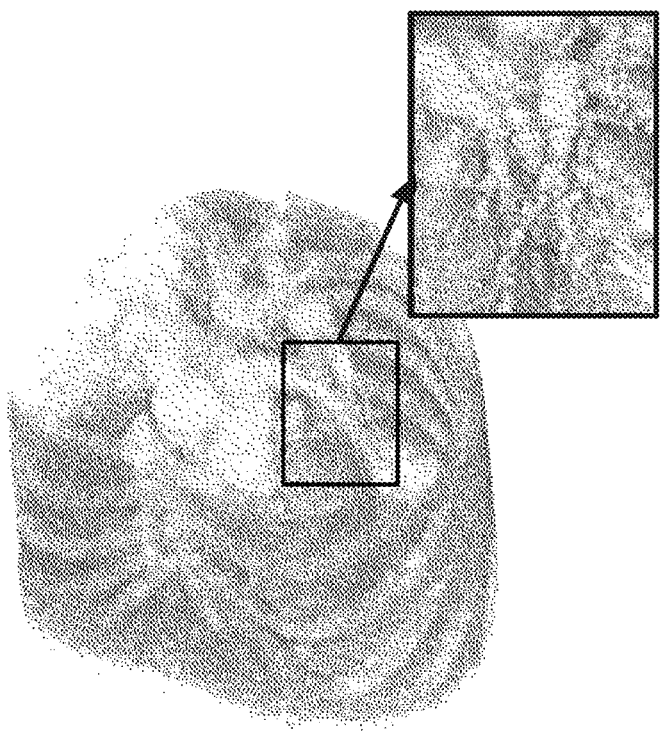
FIG. 17 is a diagram depicting an example of an image generated by a conventional art.

For example, the display as illustrated in FIG. 16 is made. Although there are unclear portions because of the gray scale, it is clearly understood that a right-upper portion obtained by expanding a portion surrounded by a black bold line clearly represents blood vessels. On the other hand, when the texture-based volume rendering only using the cross sections at regular intervals is performed, the display as illustrated in FIG. 17 is made. Also in FIG. 17, a right-upper portion obtained by expanding the same portion as in FIG. 16 is represented, however, it is apparent that the blood vessels become unclear.

As described above, when implementing this embodiment, the processing loads in the texture-based volume rendering can be reduced by reducing the data amount by the cross-section deletion processing, and the generated image becomes clear by performing the cross-section addition processing.

Next, the aforementioned region extraction processing will be explained in detail.

In this embodiment, the reaction-diffusion equation (e.g. Allen-Cahn equation) is used for the region extraction processing for the image data. A typical form of the reaction-diffusion equation will be represented in the following. In the following, a case where the pixel value of the image data is processed will be explained.

$$\frac{\partial u}{\partial t} = \alpha \Delta u + \beta u(u^2 - a)(u^2 - b)(u^2 - c)$$

A term of the left side of this equation is called "time term", and a first term of the right side of this equation is called "diffusion term", and a second term of the right side is called "reaction term". The diffusion term has a function for diffusing distribution of the pixel values, namely, a function for the smoothing, and the reaction term has a function for integrating pixel values within plural regions to be extracted into designated representative values to separate plural regions from the image, namely a function for preserving the edge forms. Incidentally, $\alpha$, $\beta$, a, b and c are constants. In addition, according to the inventors, in case of the CT image, $\alpha=0.001$ to $0.1$ and $\beta=1$ to $10$ are preferable.

Figure 18:
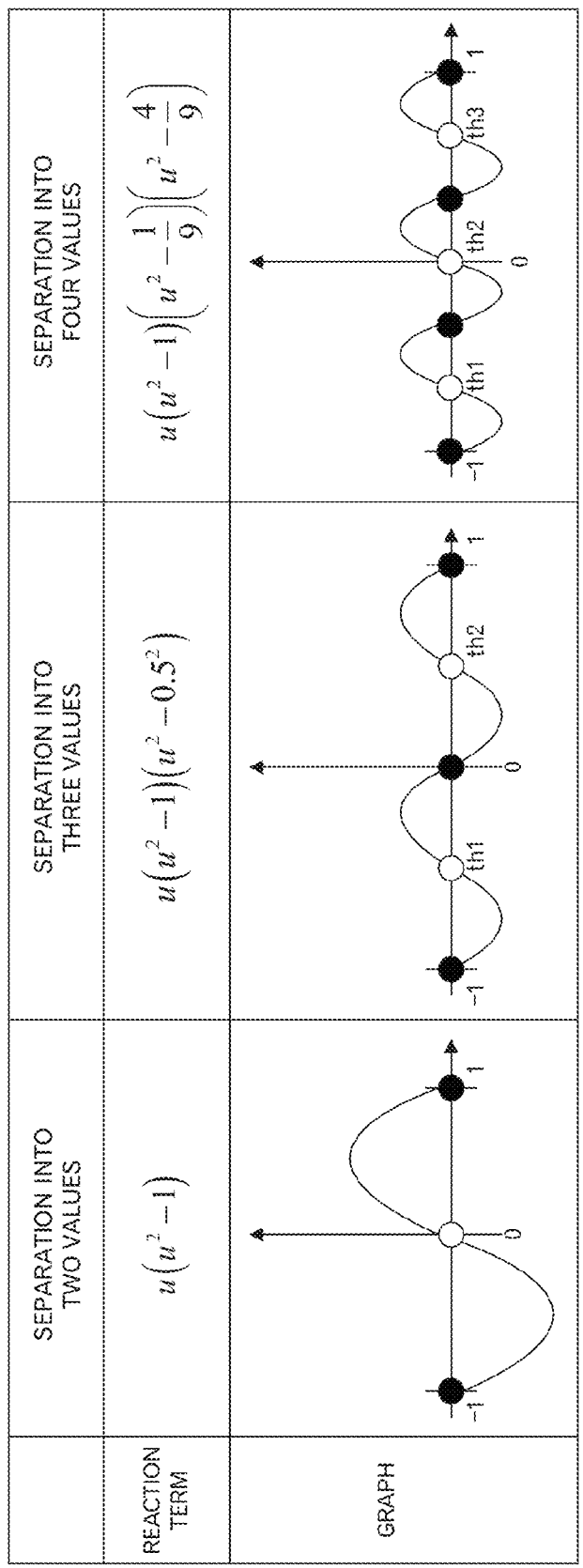
FIG. 18 is a diagram to explain a reaction term in a reaction-diffusion equation.

FIG. 18 illustrates the summary of the reaction term. In case where the separation into two values is conducted, a typical form of the reaction term is $u(u^2-1)$, and a=1 is used. Incidentally, the roots of the reaction term are 0, −1 and +1. In case where this reaction term is used, as illustrated in the graph, when a value is equal to or greater than "−1", which is illustrated by a black circle, and less than "0", which is illustrated by a white circle, the value changes to "−1", which is illustrated by the black circle. Furthermore, when a value is equal to or greater than "0", which is illustrated by the white circle and equal to or less than "+1", which is illustrated by the black circle, the value changes to "+1", which is illustrated by the black circle. For example, when the region of the bloodstream and bone is separated from other regions, a value that is considered as the least pixel value of the bloodstream region (portion to which contrast media is fulfilled.) and the region of the bone is associated with a threshold value "0".

Furthermore, in case where the separation into three values are conducted, the typical form of the reaction term is $u(u^2-1)(u^2-(\frac{1}{2})^2)$, and a=1 and b=$(\frac{1}{2})^2$. In addition, the roots of the reaction term are 0, −1 and +1, and +½ and −½. Here, th1 denotes −(½), and th2 denotes +(½). In case where that reaction term is used, as illustrated in the graph, when a value is equal to or greater than "−1", which is illustrated by the black circle, and less than th1, which is illustrated by the white circle, the value changes to "−1", which is illustrated by the black circle. In addition, when a value is equal to or greater than th1 and less than th2, which are illustrated by the white circle, the value changes to "0", which is illustrated by the black circle. Furthermore, when a value is equal to or greater than th2, which is illustrated by the white circle and equal to or less than "+1", which is illustrated by the black circle, the value changes to "+1", which is illustrated by the black circle. For example, when a first region including the region of the myocardia and the blood vessel, a second region including the region of the bloodstream (portion to which the contrast media are fulfilled.) and the region of the bone, and a region including others are separated, the value that is considered as the least pixel value of the first region is associated with th1, and the value that is considered as the least pixel value of the second region is associated with th2.

Furthermore, in case of the separation into four values, the typical form of the reaction term is $u(u^2-1)(u^2-\frac{1}{9})(u^2-\frac{4}{9})$ and a=1, b=$(\frac{1}{3})$ and c=$(\frac{2}{3})^2$. In addition, the roots of the reaction term are 0, −1 and +1, and +(⅓)−(⅓), and +(⅔) and −(⅔). Here, th1 denotes −(⅔) and th3 denotes +(⅔). In addition, th2 denotes "0". In case where the reaction term is used, as illustrated in the graph, when a value is equal to or greater than "−1", which is illustrated by the black circle, and less than th1, which is illustrated by the white circle, the value changes to "−1", which is illustrated by the black circle. In addition, when a value is equal to or greater than th1 and less than th2, which are illustrated by the white circle, the value changes to −(⅓) which is illustrated by the black circle. Furthermore, when a value is equal to or greater than th2 and less than th3, which are illustrated by the white circle, the value changes to +(⅓) which is illustrated by the black circle. Moreover, when a value is equal to or greater than th3, which is illustrated by the white circle and equal to or less than "+1", which is illustrated by the black circle, the value changes to "+1", which is illustrated by the black circle. For example, when the first region including the region of the myocardia and blood vessel, the second region including a region having the low brightness value due to the unevenness although the contrast media were fulfilled, a third region including the region of the bloodstream, to which the contrast media were fulfilled, and the region of the bone, and other regions are separated, a value that is considered as the least pixel value in the first region is associated with th1, a value that is considered as the least pixel value in the second region is associated with "0", and a value that is considered as the least pixel value in the third region is associated with th3.

In any case, because the variable u in the reaction-diffusion equation varies from −1 to +1, the value range conversion processing to map the pixel value to a value from −1 to +1 is carried out. On the other hand, the value range inverse-conversion processing is a processing to map the value in the range from −1 to +1 to a value range of the pixel values.

When the aforementioned typical form of the reaction term is used as it is, the following value range conversion processing is carried out. For example, a case of the separation into three values will be explained. In such a case, as described above, th1=−0.5, and the value minpvalue1 that is considered as the least pixel value of the region of the myocardia and the blood vessel is associated with th1. In addition, th2=+0.5, and the value minpvalue2 that is considered as the least pixel value of the region of the bloodstream and the region of the bone is associated with th2. Moreover, the minimum value Bmin of the value range of the pixel values is associated with "−1", and the maximum value Bmax of the value range of the pixel values is associated with "+1". Therefore, pixel values from Bmin to minpvalue1 are linearly mapped to values from "−1" to "−0.5", and pixel values from minpvalue1 to minpvalue2 are linearly mapped to values from "−0.5" to "+0.5", and pixel values from minpvalue2 to Bmax are linearly mapped to values from "+0.5" to "+1". The similar mapping is carried out reversely.

Thus, when the typical form of the reaction term is used, the linear mapping is carried out in each section, and the entire mapping is not linear.

The separation into two values and separation into four values are similarly conducted.

Figure 19:
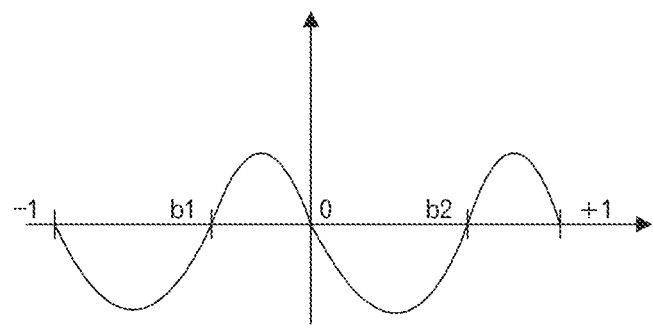
FIG. 19 is a diagram to explain a reaction term in a reaction-diffusion equation.

On the other hand, when the section from the upper limit value to the lower limit value in the value range of the pixel values is linearly mapped to a range from −1 to +1, it is required that the form of the reaction term is changed. For example, as illustrated in FIG. 19, in case of the separation into three values, the reaction term in form of u(u²−1)(u−b1)(u−b2) is adopted. In such a case, the roots b1 and b2 of the reaction term are determined as follows. Specifically, the roots are calculated based on a ratio "a section length from "−1" to b1": "a section length from "−1" to b2": "entire section length"="section length of the pixel values from Bmin to minpvalue1": "section length of the pixel values from Bmin to minpvalue2": "section length of the pixel values from Bmin to Bmax".

$b1-(-1):b2-(-1):1-(-1)=(\text{minpvalue1}-B\text{min}):(\text{minpvalue2}-B\text{min}):(B\text{max}-B\text{min})$ $b1=2(\text{minpvalue1}-B\text{min})/(B\text{max}-B\text{min})-1$
$b2=2(\text{minpvalue2}-B\text{min})/(B\text{max}-B\text{min})-1$ A function for mapping a pixel value x to a value of u is u=2(x−Bmin)/(Bmax−Bmin)−1. On the other hand, when a value of u is mapped to a pixel value X, X=½*(Bmax−Bmin)*(u+1)+Bmin.

When the form of the reaction term is changed in such a way, the value range conversion processing and value range inverse-conversion processing become linear conversion. The separation into two values and separation into four values are similarly conducted.

In this embodiment, any method may be adopted.

Next, the region extraction processing will be explained in detail by using FIG. 20. The region extraction unit 106 performs a value range conversion processing for each pixel values included in the image data to be processed as described above (step S120). The region extraction unit 106 sets time n=1 (step S121). Then, the region extraction unit 106 identifies one unprocessed pixel in the image data (including pixel values after the value range conversion processing) stored in the second data storage unit 105 (step S123).

Then, the region extraction unit 106 updates the pixel value of the identified pixel by using the reaction-diffusion equation, and stores the updated value into the second data storage unit 105 (step S129).

The aforementioned reaction-diffusion equation is represented in the discrete form as follows:

$$u_{ij}^{n+1} = u_{ij}^n + \alpha \Delta t \left\{ \frac{u_{i-1,j}^n - 2u_{ij}^n + u_{i+1,j}^n}{\Delta h^2} + \frac{u_{i,j-1}^n - 2u_{ij}^n + u_{i,j+1}^n}{\Delta h^2} \right\} + \beta \Delta t \cdot u_{ij}^n ((u_{ij}^n)^2 - a)((u_{ij}^n)^2 - b)((u_{ij}^n)^2 - c)$$

In this expression, $u_{ij}^n$ represents a pixel value of the pixel identified at the step S123 at time n. $\alpha$ and $\beta$ are constants. However, when a lot of noises are included in the image, $\alpha > \beta$ is set in order to carry out the smoothing by increasing the effect of the diffusion term. When the noise is few, $\alpha < \beta$ is set in order to enhance the region separation by increasing the effect of the reaction term.

In addition, according to the inventors, it is preferable that $\Delta t$ is determined so that $\Delta t/\Delta h$ ($\Delta h$ is a pixel width) is almost 0.8. In addition, constants a, b and c are determined as described above.

Figure 21:
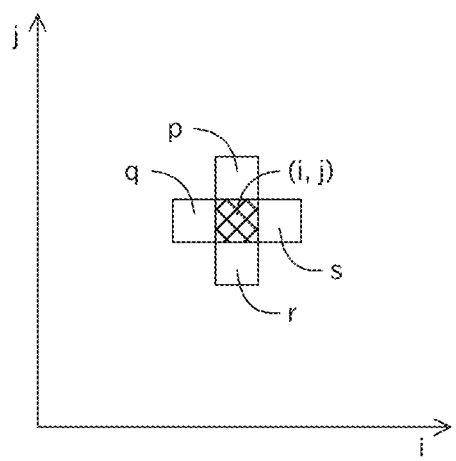
FIG. 21 is a diagram to explain a discrete reaction-diffusion equation.

Furthermore, as schematically illustrated in FIG. 21, in the second term of this expression, the pixel values q(i−1, j) and s(i+1, j) of the left pixel and right pixel of the pixel (i, j) identified at the step S123 and pixel values p(i, j+1) and r(i, j−1) of the upper pixel and lower pixel are used.

After calculating the reaction-diffusion equation, the pixel value $u_{ij}^{n+1}$ at time (n+1) is stored into the second data storage unit 105.

Then, the region extraction unit 106 determines whether or not an unprocessed pixel exists in the second data storage unit 105 (step S131). When there is an unprocessed pixel, the processing returns to the step S123. On the other hand, when all of the pixels have been processed, the region extraction unit 106 increments n by "1" (step S132), and determines whether or not n exceeds $n_{max}$ (a value designated by the user or a predetermined value in the system) (step S133). When n does not reach $n_{max}$, the region extraction unit 106 sets "unprocessed" to all of the pixels (step S135), and the processing returns to the step S123. On the other hand, when n reaches $n_{max}$, the region extraction unit 106 performs a value range inverse-conversion processing for the processing results of the region extraction processing, which are stored in the second data storage unit 105, and stores the processing results into the third data storage unit 107 (step S137). Then, the processing returns to the calling-source processing.

Although the explanation is omitted above, masks may be set in order to remove artifacts or unevenness of the brightness, and as for an image portion to which the mask is set, the pixel value may not be updated at the step S129, and the pixel value may be increased by a predetermined value, simply.

Figure 22:
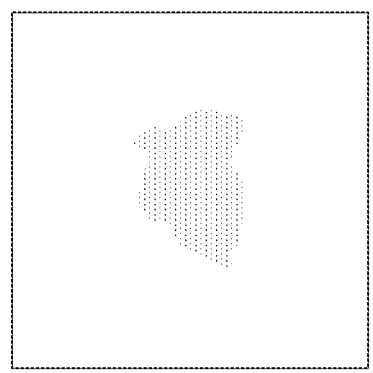
FIG. 22 is a diagram depicting an example of an input image.
Figure 23:
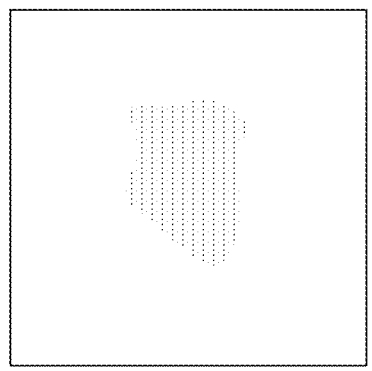
FIG. 23 is a diagram depicting an example in case where the input image is processed by a conventional filter processing.
Figure 24:
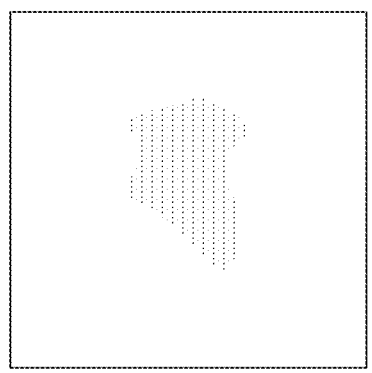
FIG. 24 is a diagram depicting an example in case where the input image is processed by the reaction-diffusion equation.

For example, in case where an image as illustrated in FIG. 22 is inputted, an image as illustrated in FIG. 23 is obtained, when a conventional filter processing is carried out to simply smooth the edges. In FIG. 23, the rough outer shape does not change. On the other hand, when the aforementioned reaction-diffusion equation is used, an image as illustrated in FIG. 24 is obtained at the time $n_{max}$. Because the diffusion term and reaction term affect with the strength determined based on the coefficients $\alpha$ and $\beta$, simplification or emphasis of the boundaries are also conducted, instead of the simple smoothing of the outer shape.

Furthermore, as described above, even in case of the separation into three values or separation into four values, the separation into regions of the respective pixel values is conducted only by repeating the same calculation of the same reaction-diffusion equation $n_{max}$ times. On the other hand, in case of the filter processing, the filter processing which is adjusted to the respective regions is carried out for each of the regions.

Figure 25:
FIG. 25 is a diagram depicting an example of a tomographic image before the processing.
Figure 26:
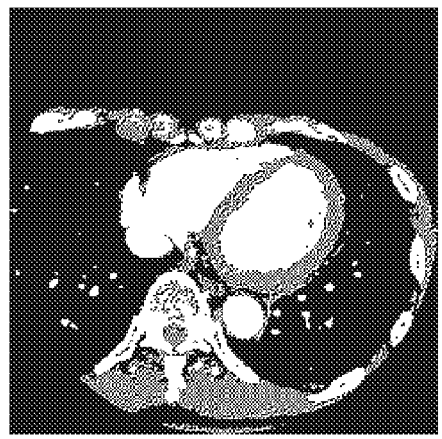
FIG. 26 is a diagram depicting an example of the tomographic image after the processing.

For example, when the tomographic image illustrated in FIG. 25 is processed, processed image data as illustrated in FIG. 26 is obtained. In an example of FIG. 26, the region of the myocardia and other muscles, the region of the bone and bloodstream and remaining region are clearly separated, and it is possible to select a region.

Figure 20:
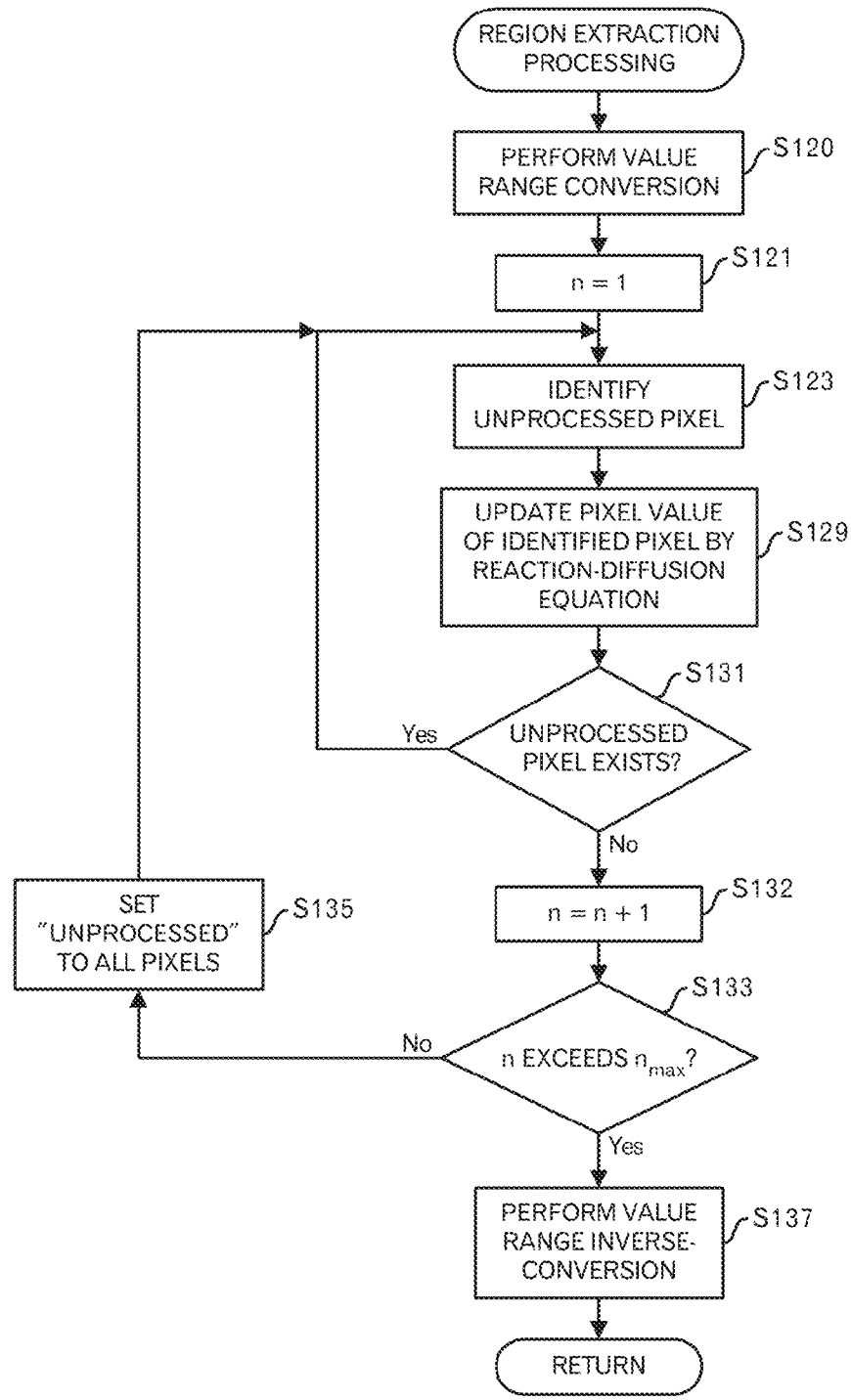
FIG. 20 is a diagram depicting a processing flow of a region extraction processing.

Incidentally, when plural tomographic images are processed as the volume data, the processing illustrated in FIG. 20 is carried out for each tomographic image.

Although the embodiments of this technique are described above, this technique is not limited to the aforementioned embodiments. For example, the functional block diagram illustrated in FIG. 1 is a mere example, and does not always correspond to a program module configuration. In addition, the data storage style as illustrated in FIG. 1 is a mere example, and another data storage style may be adopted. Furthermore, the functions of the information processing apparatus 100 may be divided to plural computers.

Moreover, in the cross-section addition processing, a cross section is added at the intermediate position between two cross sections. However, any other positions may be employed instead of the intermediate position. For example, the position may be changed according to other parameters.

Figure 27:
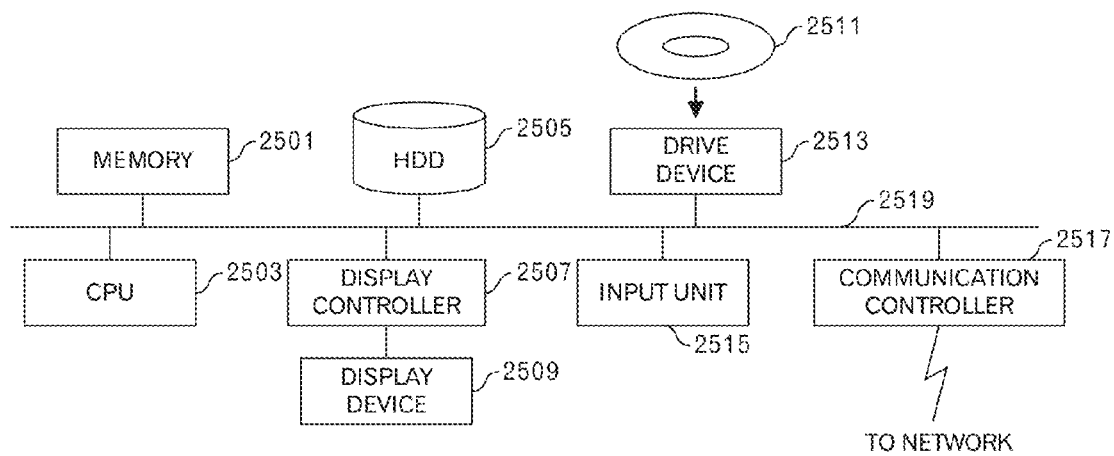
FIG. 27 is a functional block diagram of a computer.

In addition, the aforementioned information processing apparatus 100 is a computer device as illustrated in FIG. 27. That is, a memory 2501 (storage device), a CPU 2503 (processor), a harddisk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 27. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are outlined as follows:

A rendering processing method relating to this embodiment includes: (A) extracting a region from each of plural cross sections in a volume data representing a solid to be rendered, based on data of brightness values of texels for each of the plural cross sections, wherein the data of the brightness values is stored in a data storage unit, and the plural cross sections are perpendicular to an axis set for the volume data; (B) performing a cross section change processing including deleting any one of two adjacent cross sections among the plural cross sections based on a correlation between a region extracted for one cross section of the two adjacent cross sections and a region extracted for the other cross section of the two adjacent cross sections; and (C) performing a texture-based volume rendering by using data of the cross sections after the cross section change processing.

For example, by deleting any one of the cross sections having a high correlation, the processing loads in the texture-based volume rendering can be reduced.

Moreover, the aforementioned cross section change processing may include: adding a cross section between the two adjacent cross sections based on the correlation. For example, when the correlation is low because the regions extracted from the two adjacent cross sections are largely different, it becomes possible to preferably render the solid by adding the cross section.

Furthermore, the aforementioned deleting may include: calculating a correlation value based on whether or not a brightness value in the region extracted for the one cross section matches a brightness value in the region extracted for the other cross section; and when the calculated correlation value exceeds a threshold, deleting any one of the two adjacent cross sections. Thus, it is possible to simply calculate the correlation value. For example, the brightness value at the center of gravity for the region may be used.

Moreover, the aforementioned adding may include: calculating a correlation value based on whether or not a brightness value of each of plural texels included in a largest region among regions extracted for the two adjacent cross sections matches a brightness value of a corresponding texel in a cross section different from a cross section including the largest region among the two adjacent cross sections; and when the calculated correlation value is less than a threshold, adding a cross section between the two adjacent cross sections. Thus, it is possible to simply calculate the correlation value. Furthermore, the aforementioned rendering method may further include: before the adding, determining whether or not a corresponding region exists, which includes a texel that corresponds to a predetermined texel in the largest region and is included in the cross section different from the cross section including the largest region among the two adjacent cross sections; and when the corresponding region exists, determining whether or not a ratio of an area of the corresponding region to an area of the largest region is less than a second threshold. Then, when the ratio is less than the second threshold, the adding may be performed. In such a case, it is presumed that the region largely changed.

Furthermore, the aforementioned extracting may include: performing value range conversion for a first brightness value of each texel of the cross section to generate a second brightness value of the each texel; applying a reaction-diffusion equation including a diffusion element and a reaction element that is set according to at least the number of types of regions to be extracted, to the second brightness value of the each texel a predetermined number of times to generate a third brightness value of the each texel; and performing value range inverse-conversion that is inverse-conversion of the value range conversion, for the third brightness value of the each texel to generate a fourth brightness value of the each texel. The regions can be collectively extracted.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:
    extracting a region from each of a plurality of cross sections in volume data representing a solid to be rendered, based on data of brightness values of texels for each of the plurality of cross sections, wherein the plurality of cross sections are perpendicular to an axis set for the volume data;
    calculating a first correlation value based on whether or not a brightness value in a region extracted for one cross section of two adjacent cross sections among the plurality of cross sections matches a brightness value in a region extracted for the other cross section of the two adjacent cross sections;
    upon detecting that the first correlation value exceeds a first threshold, deleting any one of the two adjacent cross sections; and
    rendering the solid by using data of the cross sections after the deleting.

2. The computer-readable, non-transitory storage medium as set forth in claim 1, wherein the process further comprises:
    adding a cross section between the two adjacent cross sections based on a correlation between the region extracted for the one cross section of the two adjacent cross sections and the region extracted for the other cross section of the two adjacent cross sections, and
    the rendering is performed by using data of cross sections after the deleting and the adding.

3. The computer-readable, non-transitory storage medium as set forth in claim 2, wherein the adding comprises:
    calculating a second correlation value based on whether or not a brightness value of each of a plurality of texels included in a largest region among regions extracted for the two adjacent cross sections matches a brightness value of a corresponding texel in a cross section different from a cross section including the largest region among the two adjacent cross sections; and
    upon detecting that the second correlation value is less than a second threshold, adding a cross section between the two adjacent cross sections.

4. The computer-readable, non-transitory storage medium as set forth in claim 3, wherein the process further comprises:
    before the adding, determining whether or not a corresponding region exists, which includes a texel that corresponds to a predetermined texel in the largest region and is included in the cross section different from the cross section including the largest region among the two adjacent cross sections; and
    upon detecting that the corresponding region exists, determining whether or not a ratio of an area of the corresponding region to an area of the largest region is less than a third threshold; and
    upon detecting that the ratio is less than the third threshold, the adding is performed.

5. The computer-readable, non-transitory storage medium as set forth in claim 1, wherein the extracting comprises:
    performing value range conversion for a first brightness value of each texel of the cross section to generate a second brightness value of the each texel;
    applying a reaction-diffusion equation including a diffusion element and a reaction element that is set according to at least the number of types of regions to be extracted, to the second brightness value of the each texel a predetermined number of times to generate a third brightness value of the each texel; and
    performing value range inverse-conversion that is inverse-conversion of the value range conversion, for the third brightness value of the each texel to generate a fourth brightness value of the each texel.

6. A rendering processing method, comprising:
    extracting, by using a computer, a region from each of a plurality of cross sections in volume data representing a solid to be rendered, based on data of brightness values of texels for each of the plurality of cross sections, wherein the plurality of cross sections are perpendicular to an axis set for the volume data;
    calculating, by using the computer, a correlation value based on whether or not a brightness value in a region extracted for one cross section of two adjacent cross sections among the plurality of cross sections matches a brightness value in a region extracted for the other cross section of the two adjacent cross sections;
    upon detecting that the calculated correlation value exceeds a threshold, deleting, by using the computer, any one of the two adjacent cross sections; and
    rendering, by using the computer, the solid by using data of the cross sections after the deleting.

7. A rendering processing apparatus, comprising:
    a memory; and
    one or plural processors configured to use the memory and execute a process, the process comprising:
    extracting a region from each of a plurality of cross sections in volume data representing a solid to be rendered, based on data of brightness values of texels for each of the plurality of cross sections, wherein the plurality of cross sections are perpendicular to an axis set for the volume data;
    calculating a correlation value based on whether or not a brightness value in a region extracted for one cross section of two adjacent cross sections among the plurality of cross sections matches a brightness value in a region extracted for the other cross section of the two adjacent cross sections;
    upon detecting that the calculated correlation value exceeds a threshold, deleting any one of the two adjacent cross sections; and
    rendering the solid by using data of the cross sections after the deleting.

* * * * *